Jan. 11, 1938.  G. E. WIESE ET AL  2,104,842
MILK PAIL SUPPORTER
Filed Sept. 23, 1936
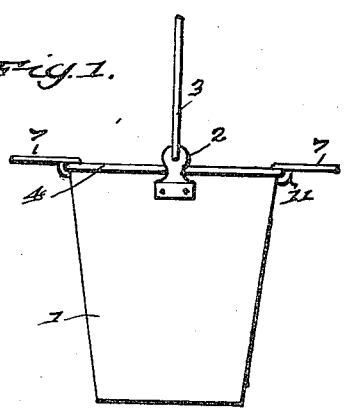
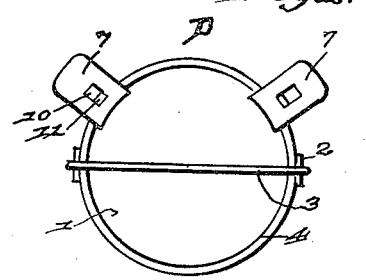
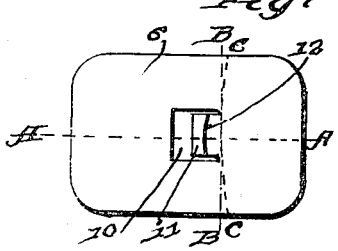
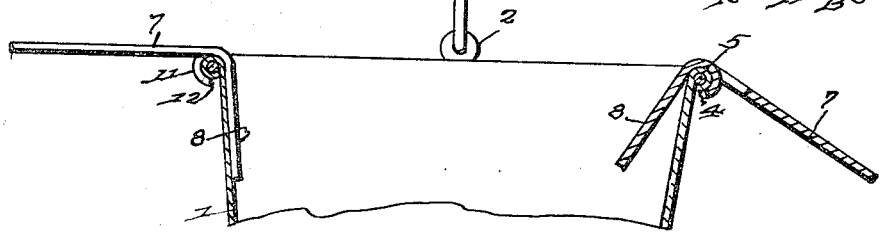
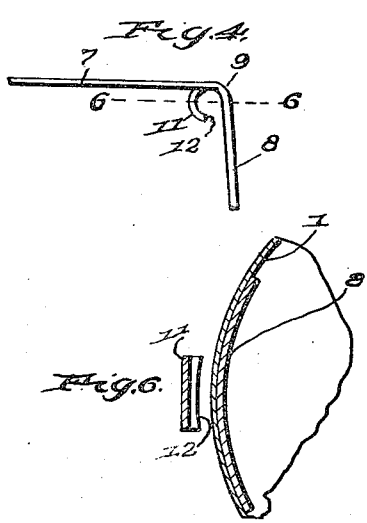
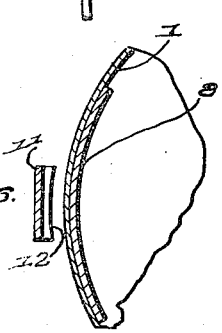
INVENTORS
George E. Wiese
Don Culwell
Carl H. Crawford
ATTORNEY Patented Jan. 11, 1938

2,104,842

UNITED STATES PATENT OFFICE 2,104,842

MILK PAIL SUPPORTER

George E. Wiese and Don Culwell, Spokane, Wash.

Application September 23, 1936, Serial No. 102,132

3 Claims. (Cl. 31—54)

The object of this invention is to provide a novel type of milk pail or like supporter.

It is well known that a hand milker supports the pail by clutching the latter between his legs and as the weight of the pail increases as it is being filled, the physical strain on the milker makes a heavy draft upon his vitality, and it is a primary object of this invention to facilitate the effort of holding a milk pail during the milking operation.

Practically all milk pails are equipped with a bail that is connected to the pail body by ears, and in various makes of pails the shapes of the ears vary considerably and it is a very important object of this invention to provide a pail supporting means which can readily be attached or connected to and disconnected from the pail independent of the ears so that connection may be made at any convenient peripheral location and whereby the supporters may be slidably adjusted after connection with the pail.

A further feature is to provide supporters all in one piece and without any relatively movable or adjustable parts thereby not only simplifying manufacture but also facilitating the work of rendering the supporters sanitary and easily cleaned.

It is also a feature of the invention to provide pail supporters of a novel type that will fit pails of a wide variety of size and make, as regards the diameter adjacent the bead, and also as regards variation in the size of the bead, and whereby the supporters will efficiently function irrespective of such variations.

The invention has many other features and objects which will be more fully described in connection with the accompanying drawing and which will be more particularly pointed out in and by the appended claims.

In the drawing:—

Fig. 1 is a view in side elevation of a milk pail equipped with the device of our invention.

Fig. 2 is a plan view thereof.

Fig. 3 is an enlarged sectional view of a milk pail showing one supporter in an operative position and the other being adjusted into an operative position.

Fig. 4 is a view in side elevation of one of the supporters.

Fig. 5 is a plan view thereof.

Fig. 6 is a sectional view on line 6—6 of Fig. 4, showing the relationship of a part of the supporter with a pail.

Fig. 7 is a plan view of the blank from which the supporter is formed.

Like characters of reference designate similar parts throughout the different figures of the drawing.

As shown, a conventional form of milk pail is indicated at 1, the same having ears 2, attached thereto and a bail 3 connected to the ears 2. The pail, as usual, is stiffened by what is known as a bead 4 that is frequently formed about a wire 5, the bead being most generally of cylindrical form although varying slightly in diameter as regards pails of different manufacturers.

The device of our invention involves a pair of pail supporters but as both are identical in form and function, only one need be described in detail.

This supporter is formed from a blank consisting of a flat plate, preferably of metal, and substantially rigid although absolute rigidity is not essential, the plate blank being indicated at 6, in Fig. 7, before it is fully formed. We have indicated the longitudinal axis of said plate by line A—A and the transverse axis, which is also the line of bend, by dotted line B—B. A suitable gauge, proportionately, is shown in the edge views and need not be specified.

This plate is bent to final form, in the embodiment shown, on a slightly curved line C—C, which intersects line B—B, and as shown in Fig. 4, the plate is shaped to form a relatively long leg section 7 and a relatively short pail abutment section 8. Hence, it will be seen that the line of bend is nearer one end of the plate than the other, and it is an advantage to bend the plate to slightly less than what would be a right angular relationship of the sections 7 and 8, as will later appear, although in some forms, these sections may be disposed at a substantially accurate right angular relation.

It is important to note that the line of bend C—C is such that lengthwise of the plate, the latter is curved at 9, which is the bight of the bend, in such a manner and to such a radius that it will substantially fit and fulcrum on the upper peripheral portion, or in fact any peripheral portion of the bead 4, with which it engages.

We also provide the supported with a bead holder which, deepndent upon the stamping or die operation, may be formed when the plate is in a blank or after being bent, which is immaterial to this invention. This bead holder, as shown, is in the form of a lug which is struck up from the stock of section 7, the resulting opening being indicated at 10, and it will be seen that this cut out or struck up lug extends from approximately the line of bend C—C outwardly toward the free end of the leg section. Thus, viewing the right hand supporter in Fig. 3, it will be clear that when this lug is formed, it assumes a semi-cylindrical shape, as indicated at 11. It is also important to note that this cylindrical lug's curvature, forms a continuation of the curvature of the bight bend 9, so that the lug or holder 11, is thus shaped to loosely engage the outer and lower periphery of the bead 4. The terminal edge 12, of the holder 11, is shown concavely curved in Fig. 7, so that the edge 12 will pass over the periphery of the bead with less necessity for clearance space than would be true if said edge were straight.

At this point, it is desired to state that due to the novel construction of our supporter, it is possible to make the coacting parts of such oversize proportions that the supporters will always fit loosely on any but the larger size pails, and yet because of the counter-acting stresses resulting from this construction, after the weight of the pail has been imposed on the supporters, the latter will firmly contact and efficiently support the pail.

We will next point out the advantage of transversely curving section 8, with special reference to Fig. 6, which shows how the section abuts against the interior face of the pail, and this would be substantially true even with a fairly wide variation of radii between the pail and section 8. It will now be clear that if section 8, were transversely flat, then it would only engage the inner face of the pail at its end edges. Hence, if the sections 7 and 8, were at a true rectangular relation, the leg section 7 would be disposed at an inconvenient downward incline from the horizontal. Thus it should now be clear that there is an advantage, even with the curvature of section 8, in disposing the latter at more than a rectangular relation with section 7, because even with such curvature, there is a slight variation in the diameter of different size milk pails. It will now be clear why we are able to make a single size supporter capable of fitting a variety of pail sizes.

The manner in which the device of our invention is operated and used will next be described in detail.

In Fig. 3, we have shown how the supporters can be applied to the bead and at the right of said figure, a supporter is shown being applied and before it has been shifted into a final position. At the left of said figure, we have shown a supporter shifted into a final position. It will now be clear that the supporters can be connected with the pail at any convenient circumferential position along the bead 4, irrespective of the position of the ears 2.

In Fig. 2, we have shown the supporters disposed between ears 2, and located in such a manner as to shift the center of gravity of the pail so that the upper end will be inclined toward the bag of the cow, which is the usual milking position. The bail 3, may then be swung down onto the supporters and toward position D, which indicates the body of the milker. This position of the bail is employed because it can be readily grasped if the cow should kick.

When the milker disposes the pail between his legs, the sections 7 are disposed upon the tops of his legs and the weight of the pail causes the supporters to fulcrum on the bead and bring sections 8, into engagement against the inner face of the pail, thereby limiting upward movement of sections 7, above a substantially horizontal position. The actual weight of the pail is carried by and sustained by the holders 11, which engage the bead 4 below a horizontal line intersecting the axis of the bead.

It is believed that our invention will be fully understood from the foregoing description, and while we have herein shown and described one specific form of the invention, we do not wish to be limited thereto except for such limitations as the claims may import.

We claim:—

1. A milk pail supporter comprising a substantially rigid elongated plate bent upon itself to slightly less than a right angle on a line curved transversely to the longitudinal axis of said plate and the bight of said bend being curved to fulcrum on the upper periphery of the bead of a milk pail, the line of bend being nearer one end of said plate than the other to form a relatively long leg supporting section adapted to project from the pail and a relatively short abutment section adapted to engage the inner face of the pail, and said abutment section being curved transversely of its length substantially to correspond to the curvature of the pail, and a laterally central portion of the stock of said leg supporting section being struck out from the bight of said bend toward the free end of said leg supporting section and shaped to semi-cylindrical form for engagement with the outer and lower periphery of the bead to form a continuation of said curved bight.

2. A milk pail supporter comprising a rigid elongated plate bent upon itself at a substantial right angle on a line transverse to the longitudinal axis of said plate and the bight of said bend being curved to fulcrum on the upper periphery of the bead of a milk pail, the line of bend being nearer one end than the other of said plate to form a relatively long leg supporting section and a relatively short pail abutment section and the latter being adapted for engagement with the inner face of a pail, and a laterally central portion of the stock of said leg supporting section being struck out and shaped to semi-cylindrical form for engagement with the outer and lower periphery of the bead of the pail to form a continuation of said curved bight.

3. A milk pail supporter comprising an elongated plate bent upon itself at a substantially right angle on a line transverse to the longitudinal axis of said plate and the bight of said bend being curved to fulcrum on the upper periphery of the bead of a pail, the line of bend being nearer one end than the other of said plate to form the latter into a relatively long leg supporting section and a relatively short pail abutment section and the latter being adapted to engage the inner face of the pail, and said leg supporting section having a semi-cylindrical holding lug adapted to engage the outer and lower periphery of the bead of a pail to form a continuation of said curved bight.

GEORGE E. WIESE.
DON CULWELL.